Dec. 16, 1969     K. H. BECKER     3,484,610
STIMULATED EXOELECTRON EMISSION DOSIMETERS
Filed Sept. 23, 1968     2 Sheets-Sheet 1

INVENTOR.
Klaus H. Becker
BY
ATTORNEY.

Dec. 16, 1969   K. H. BECKER   3,484,610

STIMULATED EXOELECTRON EMISSION DOSIMETERS

Filed Sept. 23, 1968   2 Sheets-Sheet 2

INVENTOR.
Klaus H. Becker
BY
ATTORNEY.

United States Patent Office 3,484,610
Patented Dec. 16, 1969

3,484,610
STIMULATED EXOELECTRON EMISSION DOSIMETERS
Klaus H. Becker, Oak Ridge, Tenn., assignor to the United States of America as represented by the United States Atomic Energy Commission
Filed Sept. 23, 1968, Ser. No. 761,470
Int. Cl. H01j *39/00;* G01t *1/16, 1/18*
U.S. Cl. 250—83.3                      10 Claims

ABSTRACT OF THE DISCLOSURE

Use is made of low-energy electrons emitted from thin layers of irradiated ionic crystals, when stimulated by optical or thermal means, for dosimetry. Specially constructed detectors and/or combinations of operating conditions provide for dosimetry of photons, thermal neutrons, fast neutrons, beta radiation, heavy ions, and/or combinations thereof in a wide dose and energy range. In addition, information may be obtained as to several important characteristics of the radiation such as the energy distribution thereof, for example.

BACKGROUND OF THE INVENTION

The present invention was made in the course of, or under, a contract with the U.S. Atomic Energy Commission.

The field of art to which the present invention pertains is that concerning methods and/or apparatus for detecting and measuring the effects of radiation on certain materials to provide an indication of radiation doses.

It has long been known in the art that various types of radiation produce internal effects in many compounds of an unstable nature that may be removed by optical or thermal stimulation. Much of the research in this field has been devoted to the luminescence of these materials during a thermal stimulation and the application of this thermoluminescence to dosimetry. Thermoluminescent detectors have several disadvantages. For example, preparation of most of the detectors and their annealing for reuse are complicated procedures; some detectors have a supralinear response to radiation, others a pronounced energy dependence; some other detectors exhibit high sensitivity but a strong fading; and the radiation effect of all such prior detectors is always a volume effect. In addition, most detector materials of such prior detectors require an activation by other elements. Furthermore, there are many measurements that cannot be made with a single detector.

Also known in the art is the fact that low-energy electrons (exoelectrons) are emitted from the surface of some irradiated substances during the optical or thermal stimulation thereof. However, the physical effect of thermally or optically stimulated emission of low-energy electrons from the surface of irradiated substances for the purpose of widespread use; for example, in personnel dosimetry, radiation research, or industrial uses of radiation, has been almost completely neglected prior to the present invention. The stimulated exoelectron emission detectors that have been used prior to the present invention consisted of a powdered material loosely attached to the surface of a metal or graphite carrier. They have been only used for photon dosimetry. In such prior detectors, the methods used for preparing the detectors and reading the dose therefrom were impractical for widespread use in dosimetry. The present invention was conceived to provide improved means and methods for the use of thermally stimulated exoelectron emission (TSEE) dosimetry of not only photons, but also of thermal neutrons, fast neutrons, beta radiation, heavy ions, and mixed radiation.

SUMMARY OF THE INVENTION

It is the object of the present invention to provide improved thermally, or optically, stimulated exoelectron emission detectors and methods of use thereof such that the detection and measurement of radiation doses effected by photons, thermal neutrons, fast neutrons, beta radiation, heavy ions, and/or combinations thereof may be accomplished in a rapid, accurate, and efficient manner.

The above object has been accomplished by using one or more of the following techniques:

(1) Preparation of very thin detector layers on the surface of conductive carrier materials by a suitable chemical treatment such as oxidation of metal surfaces by heating in air, or by a physical treatment such as evaporation of detector materials onto the carrier's surface;

(2) Preparation of detectors by hot-pressing or sintering mixtures of detector materials, electrically conductive materials, and, if desirable, further additives;

(3) Enclosing the detector material or materials with or without conductive and other additives either as a dry powder or incorporated into liquids, gels, or solids and preparation of the readable units after the irradiation;

(4) Use of multicomponent detectors consisting of two or more materials which emit exoelectrons under different stimulation conditions; for example, at different temperatures;

(5) Coating the inner walls with or making the walls of sealed or open GM-counters or ionization chambers in part or completely consisting of suitable mixtures of detector materials and additives;

(6) Use of detectors or detector combinations containing hydrogenous materials for the dosimetry of fast neutrons;

(7) Use of differences in the response of certain detector materials to radiations having a different linear energy transfer;

(8) Use of partial annealing techniques for the reduction of the detector's sensitivity and/or multiple dose readings.

DESCRIPTION OF THE PREFERRED EMBODIMENTS

Figure 1:
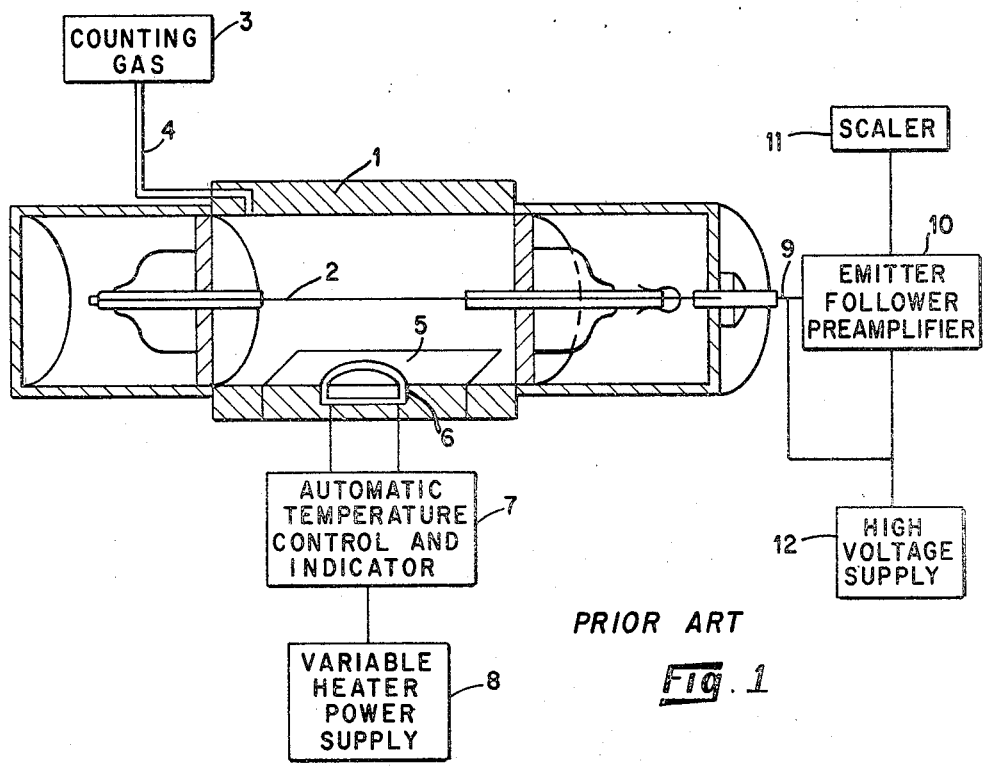
FIG. 1 is a cross sectional view of a conventional gas-flow GM-counter modified to incorporate a removable sample-holding heater element for TSEE measurements.

The device illustrated in FIG. 1 is a conventional gas-flow GM-counter that has been modified such that it may be used as a reader for determining the thermally stimulated low-energy electron emission rate from the surface of irradiated samples. The counting volume of the device of FIG. 1 defined by the member 1 and suitable end walls has a wire collector electrode 2 mounted therein, and a counting gas mixture of 99.5% helium and 0.5% isobutane, for example, is supplied from a source 3 into the counting volume by means of a feed tube 4. An emitter follower preamplifier 10 is connected to the collector electrode 2 by means of a lead 9, and the unit 10 together with a high voltage supply 12 and a scaler 11 is utilized for counting in a conventional manner. Equipment for recording the count rate as a function of temperature or heating time can easily be attached.

The counter of FIG. 1, having the conventional components as set forth above, has been modified for the purposes of the present invention in the following manner: The counting volume, described above, contains a circular heating element 6 onto which a sample on a carrier can be placed. The heater is made of a spiral heating wire inside a boron nitride disc. A thermocouple, not shown, is placed immediately under the surface of the heater disc. Mica material 5 is used for thermal insulation between the heater and the metal of the counter. The heating element 6 is connected to an automatic temperature control and indicator unit 7 which in turn is connected to a variable heater power supply 8.

In the operation of the device of FIG. 1, the detecting substance, which may, for example, be LiF, BeO, $CaF_2$, $CaSO_4$, $SrSO_4$, $BaSO_4$, $Li_2B_4O_7$, or combinations thereof, is mixed with a conductive material such as graphite or metal and deposited on a graphite (or beryllium, magnesium, aluminum, etc.) carrier disk. After irradiation it is placed in the heater block of FIG. 1 and inserted into the GM-counter. The heating rate and maximum temperature can be varied by the control equipment. The pulses corresponding to the low-energy exoelectrons emitted from the detecting substances are recorded by the conventional circuitry of FIG. 1 and, when the electron emission rate is plotted as a function of the temperature, "glow-curves" similar to thermoluminescence glow-curves can be obtained.

Figure 2:
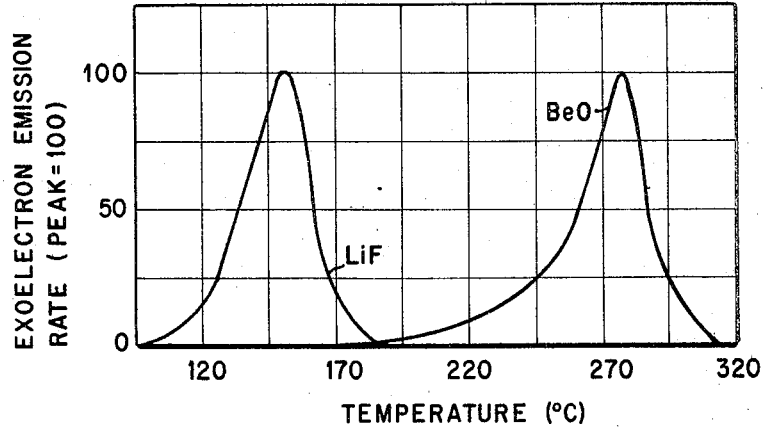
FIG. 2 is a plot of the TSEE count rate from irradiated BeO and LiF as a function of temperature, as obtained in the device of FIG. 1 at a heating rate of approximately 300° C./min.

The number of released electrons during a typical operation of the counter normally is a linear function of the dose up to a saturation dose of approximately $10^5$ to $10^6$ R. In FIG. 2 is plotted the electron emission rate, as a function of temperature, for both irradiated LiF and BeO. It is apparent that a different temperature is required to obtain maximum electron emission from these two materials. It is this operational characteristic that is utilized in a detector consisting of a mixture of both materials for determining short-term doses and the integrated long-term dose, or for detection of one type of radiation in the presence of another type of radiation in a manner to be described below.

It has further been determined that the sensitivity of the detecting substances is a linear function of the surface area and a supralinear function of the concentration of the detector material in an inert material such as graphite powder (it was known that additions of a conductive material improve the characteristics of TSEE detectors). A mixture of approximately 75% of the detector material and 25% C may be, and preferably is, used as a compromise where high sensitivity is desirable. The addition of carbon to a material, having an atomic number higher than tissue, such as LiF, also reduces its energy dependence. To adjust the energy response to any desired value; for example, to tissue or bone equivalence, small quantities of high-Z TSEE or inert materials may be added to the above low-Z TSEE detector mixtures. The above mixtures, as any other detector mixture, can be hot-pressed or sintered in order to form tablet-like detectors which are more uniform, more stable, and easier to handle.

In order to provide a detector having a good fast neutron response, a hydrogenous material is added to the detecting element or to its environment so as to produce recoil protons. For thermal neutron dosimetry, the incorporation of substances with high thermal neutron cross sections provides for such a detector. In each case the electrons are released by optical or thermal stimulation after irradiation and their number is directly proportional to the dose.

Being able to determine the dose due to a specific type of radiation permits the detection of one type of radiation in the presence of another type. For example, identical detectors except that one is provided with a hydrogenous component may be irradiated in a mixed fast neutron and gamma flux. The detector without the hydrogenous material provides information as to the gamma dose and thus the difference in the response of the two detectors is attributable to the neutron dose.

A similar principle can be used for thermal neutron dosimetry using a multicomponent detector which contains two or more materials that exhibit different sensitivities to thermal neutrons and photons, e.g., a mixture of LiF having a high cross section for thermal neutrons and BeO which is only sensitive to photons. The dose contributions of the two types if radiation may be obtained by heating to about 180° C. to release the trapped electrons from the LiF, and subsequent heating to about 300° C. to release the electrons from BeO, as illustrated in FIG. 2. The ratios of the two components can then be used to determine both the photon and the thermal neutron dose.

Another utilization of a multicomponent detector is that of effective photon energy determination. If two components are used having a substantially different effective atomic number, their photon energy response will be different. The ratio of the TSEE peaks then depends on the energy of the incident radiation.

Still another advantage to be gained by a multicomponent detector is that of being able to repeatedly determine short-term doses while at the same time retaining information in the detector as to the integrated long-term dose that may subsequently be determined. Again, this may be accomplished using substances such as LiF and BeO. Both of these are sensitive to photon radiation and the number of electrons emitted, when stimulated, is proportional to the dose received. However, the detector may be heated to about 180° C. only to stimulate the electron emission from the LiF without appreciable effect upon the dose information stored in the BeO. Thus, repeated reading of the LiF, as on a daily or weekly basis, may be used to determine the dose in each of the intervals. At longer intervals, the integrated dose, as recorded in the BeO, may be read by heating to about 300° C.

While it may be convenient to insert an irradiated sample in a GM-counter (FIG. 1) in a laboratory for occasional studies, this could be inconvenient for large-scale use in personnel dosimetry, etc. Therefore, a more useable form of dosimeter detector is desirable.

Figure 3:
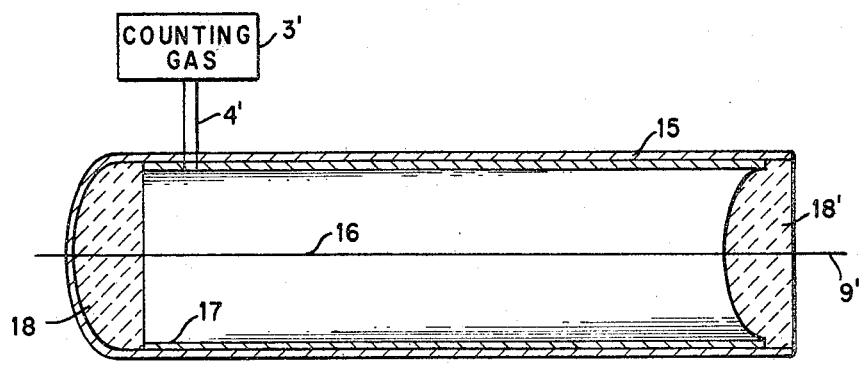
FIG. 3 is a sectional view of an improved stimulated exoelectron emission detector unit.

Such a dosimeter is illustrated in FIG. 3. While there are many possible embodiments, all include the features of encapsulating detector substances together with the essential electron collecting electrode required for dosimeter reading. In the illustrated dosimeter of FIG. 3, low-Z detector substances 17, such as BeO, LiF, or $Li_2B_4O_7$, or high-Z materials such as $BaSO_4$ or $SrSO_4$, are mixed in powder form with a conducting material, such as graphite, and are coated on the interior surface of an envelope 15, e.g., a cylinder of metal, alloy, glass, plastic, or the like. For some applications, the dosimeter enclosure may be frabricated from the detector substance or from a metal whose surface is oxidized in order to form a TSEE detector layer. The ends of the enclosure are closed with insulators 18, 18', and a conductive wire 16 passes through the insulators and along the axis of the envelope.

The dosimeter is normally filled with a conventional counter gas, as in FIG. 1, from a source 3' and feed tube 4'. To enhance the response to a given radiation, for example, to thermal neutrons, another gas such as $BF_3$ may be used. Similarly, a hydrogenous substance may be included in the wall material, the counting gas, or mixed with the detector substance in order to increase the neutron sensitivity.

The sensitivity of detectors may be varied within wide limits by several methods. It is desirable to reduce the sensitivity at high dose levels since high count rates may block the counter. This can be done, for example, by covering only a small area of the enclosure with the detecting substance, by "dilution" of the detector material with an inert substance, etc. Furthermore, only a certain fraction of the total exoelectrons may be removed by stimulation. For example, at a reading temperature of maximal 255° C., not all electrons are emitted from a BeO detector. Therefore, a second heating cycle at the same temperature results in a count which is smaller than the original count by a factor of about 15. Additional heating cycles further reduce the number of remaining trapped electrons. The technique of repeated partial anneal reduces problems of overload of electronic equipment when high doses are to be read. The sensitivity may be increased by increasing the concentration of the sensitive substances, by reducing the background (as with shielding) during reading, by a special pretreatment of the detector material such as heating to high temperatures and/or preirradiation to high radiation doses.

The dosimeters may be read at any time by subjecting them to heat or short-wavelength light while the collector electrode is connected by the lead 9′ to conventional electronic measuring apparatus such as illustrated in FIG. 1. If light is to be used for the exoelectron emission stimulation, the enclosure wall or a portion thereof must be transparent to the stimulating wavelength. If heat is used for stimulation, all materials of the detector construction must be compatible with temperatures up to about 200° to 600° C., depending on the detector substances used.

During the reading operation, the dosimeter of FIG. 3 may be operated as either a GM-counter or as an ionization chamber. In the first case, pulses are counted indicating the number of electrons emitted during annealing. Use as an ionization chamber may be preferable if very high doses are to be measured. Thus, the encapsulated detector and these reading methods give rise to an efficient device for personnel dosimetry and many other dosimetry applications; for example, as a microdosimeter in biomedical research or for space radiation dosimetry, because the thickness of the sensitive material layer is extremely small (less than 100 A.).

Figure 4:
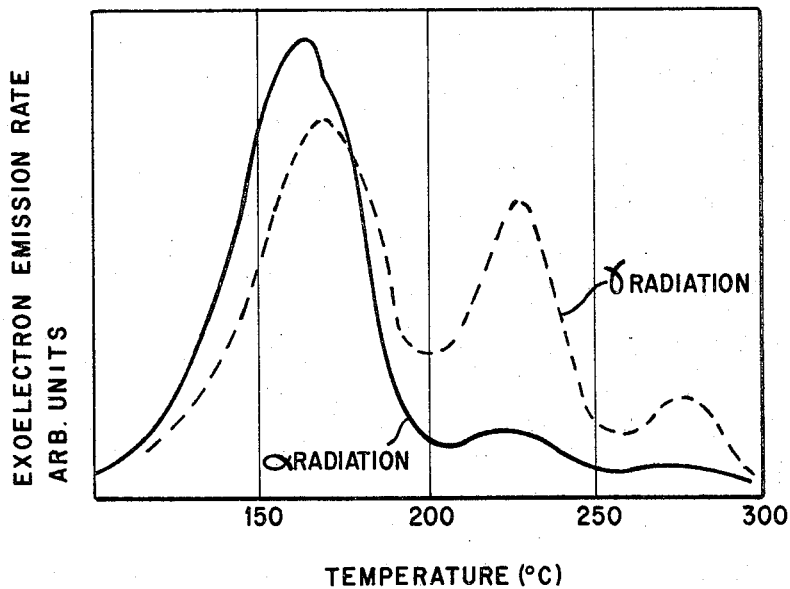
FIG. 4 is a plot of the exoelectron emission rate from a $CaSO_4$ sample during heating, following gamma and alpha irradiation.

For special applications such as biomedical research and space radiation dosimetry, a property of some TSEE materials is of great interest. As can be seen in FIG. 4, $CaSO_4$, for example, exhibits several emission peaks at different temperatures. The ratio of the peak heights clearly depends on the linear energy transfer (LET) of the radiation, as is demonstrated by the effect of low-LET gamma radiation and high-LET alpha radiation. Such a material is therefore not only an indicator of the integrated dose, but also gives information on the effective LET of the radiation. Partial annealing in such multipeak TSEE materials can be used as a means to discriminate against low-LET radiation effects; for example, in fast neutron dosimetry.

It should be noted that the stability of the stored signal in LiF in the dark is good, despite the relatively low temperature of the emission peak. No fading was observed in up to 3 days at 25° C.; however, after 5 weeks, about 30% fading occurred. In BeO detectors, on the other hand, for storage times up to several weeks, even at increased temperatures, no fading has been observed. Intense natural or artifical light anneals the radiation effect rapidly. The detectors should, therefore, be kept in a lightproof encapsulation between irradiation and reading.

The dosimeters are usually completely annealed by the reading process, and immediately ready for repeated use. It should be noted that repeated irradiation and annealing does not change the sensitivity of the detectors. Only after exposure to very high doses ($>10^4$R.) an extended annealing may be required prior to reuse and the sensitivity may change. It is also possible to expose detector materials, for example as a loose powder or mixed with a liquid such as water, alcohol, or acetone, to radiation and to prepare the detectors just prior to the reading from this material, without a loss in sensitivity. This technique has advantages whenever small detectors are required or for special measurements; for example, of neutrons. It also can be used for activity measurements in solutions, for instance of alpha or beta radioactive materials.

This invention has been described by way of illustration rather than by limitation and it should be apparent that it is equally applicable in fields other than those described.

What is claimed is:

1. A method for determining the radiation dose effected by a source of radiation, comprising the steps of exposing a detector to said source of radiation, said detector selected from the group consisting essentially of LiF, BeO, $CaSO_4$, $BaSO_4$, $SrSO_4$, $Li_2B_4O_7$, and $CaF_2$, heating said detector to a selected temperature to maximize the emission of electrons from the surface of said detector, and counting such electrons with a counter whose inner wall is coated with the selected material of said detector to provide an indication of the dose, and utilizing any differences in the response of said detector for determining the linear energy transfer rate of respective types of radiation that may be present in said source.

2. The method set forth in claim 1, wherein said method is for determining the respective radiation doses effected by at least two different types of radiation, said detector is a multicomponent detector including selected ones of said group, and said source of radiation is a mixed source of radiation, one component of said detector being sensitive to one type of radiation from said source, and another component of said detector being sensitive to a different type of radiation from said source, heating said detector to a first temperature to maximize the electron emission from said one component of said detector and measuring said electron emission, heating said detector to a second higher temperature to maximize the electron emission from said another component of said detector and measuring said another component electron emission, and utilizing the ratios of both measured components to determine the respective radiation doses effected by said two types of radiation.

3. The method set forth in claim 2, wherein said detector is formulated by mixing predetermined amounts of LiF, BeO, and carbon and sintering such a mixture to form said detector in a tablet-like shape.

4. The method set forth in claim 3, wherein a small amount of a high-Z material selected from said group consisting essentially of $CaSO_4$, $BaSO_4$, $SrSO_4$, $Li_2B_4O_7$, and $CaF_2$ is added to said mixture prior to said sintering.

5. The method set forth in claim 1, including the step of preparing said detector as a very thin detector layer on the surface of a conductive carrier material prior to said exposing step, said detector preparing step selected from the group consisting essentially of a suitable chemical treatment such as oxidation of said material by heating in air, and by a physical treatment such as evaporation of detector materials onto the surface of said carrier material.

6. The method set forth in claim 1, wherein said selected heating temperature is such that only partial annealing of said detector is effected whereby the detector's sensitivity is reduced and multiple dose readings can be made before complete annealing of said detector is effected.

7. The method set forth in claim 2, wherein said source of radiation comprises a single type of radiation, said step of heating said detector to said first temperature and measuring said electron emission from said one component and said step of exposing said detector to said source of radiation are alternately repeated a selected number of cycles to repeatedly determine a plurality of short-term doses while at the same time retaining information in said another component of said detector as to the integrated long-term dose, and subsequent to said selected number of exposure and reading cycles at said first temperature, then performing said step of heating said detector to said second higher temperature to maximize said electron emission from said another component, said measurement of said another component electron emission providing an indication of the integrated long-term dose.

8. The method set forth in claim 1, further including the step of exposing a second detector to said source of radiation, said second detector being identical to said first detector except that said second detector further includes a hydrogenous material, heating said second detector to said selected temperature, counting the electrons emitted from said second detector, whereby the respective photon dose and fast neutron dose may be determined from a comparison of said countings.

9. The method set forth in claim 1, including the step of preparing said detector by mixing said selected one of said materials with a liquid selected from the group consisting essentially of water, acetone, and alcohol.

10. An improved dosimeter for the detection of one or more types of radiation comprising a mixture of selected ones of materials selected from the group consisting essentially of LiF, BeO, $CaSO_4$, $BaSO_4$, $SrSO_4$, $Li_2B_4O_7$, and $CaF_2$, said dosimeter mixture being adapted to be coated on the inner wall of an electron counter, said dosimeter being adapted to be thermally stimulated by selective temperatures to provide for the emission of low-energy electrons as a function of the doses effected by said radiation.

References Cited
UNITED STATES PATENTS
3,101,410  8/1963  Ruby et al. _____ 250—83.1
3,399,301  8/1968  Schayes et al. _____ 250—83.1

RALPH G. NILSON, Primary Examiner
D. L. WILLIS, Assistant Examiner

U.S. Cl. X.R.
250—83.6